United States Patent [19]

Abatti et al.

[11] 4,292,784
[45] Oct. 6, 1981

[54] FIELD CROP HARVESTING AND LOADING MACHINE

[76] Inventors: Cinto A. Abatti, 1296 W. Evan Hewes Hwy., El Centro, Calif. 92243; Harold T. Ash, 1907 Orchard Rd., Holtville, Calif. 92250

[21] Appl. No.: 159,941

[22] Filed: Jun. 16, 1980

[51] Int. Cl.³ .................. A01D 67/00; B65B 67/00
[52] U.S. Cl. ............................... 53/391; 56/209; 56/DIG. 2; 414/345
[58] Field of Search .............. 53/391; 414/345, 340, 414/352, 395, 585, 505; 56/16.6, 473.5, 209, DIG. 10, DIG. 2, 328 R; 198/626, 628, 611, 587

[56] References Cited

U.S. PATENT DOCUMENTS

| | | | |
|---|---|---|---|
| 2,321,387 | 6/1943 | Jackson | 414/83.26 X |
| 2,576,992 | 12/1951 | Bainbridge et al. | 414/505 |
| 2,647,525 | 8/1953 | Duda et al. | 414/505 X |
| 2,782,943 | 2/1957 | Jones et al. | 414/508 |
| 3,273,735 | 9/1966 | Chi-Chu Kuo | 414/505 |
| 3,448,848 | 6/1969 | Washburn | 414/505 X |
| 3,592,331 | 7/1971 | Morgan | 414/505 X |
| 3,648,870 | 3/1972 | Dutschke | 198/153 X |
| 3,724,168 | 4/1973 | Cassady, Jr. et al. | 53/391 X |
| 4,026,431 | 5/1977 | Long | 414/505 |
| 4,203,697 | 5/1980 | Cayton | 414/345 |

OTHER PUBLICATIONS

Lamduria et al., "Breaking Tradition-An Engineering Solution to Vine Production", Dec. 11–14, 1962, Paper No. 62-655, ASAE Winter Meeting, 1962.

*Primary Examiner*—James F. Coan
*Attorney, Agent, or Firm*—Ralph Branscomb

[57] ABSTRACT

A means and method are provided for harvesting field crops such as watermelon, tomatoes, cabbages, brocolli, cauliflower, cucumbers, spinach, onions, red beets, turnips, squash, mixed melons, and others. The system utilizes about six identical or very similar trucks, one of which is modified to act as the harvesting truck by the attachment of a series of conveyors and hydraulic structure whereby laterally directed wing conveyors extend out over the fields and convey crops deposited thereon through other conveying mechanism up to the truck bed where it is put directly into crop shipping containers which are palletized on a roller grid attached to the truck bed. The trucks other than the harvesting truck act as shuttle trucks and back up in sequence to the rear of the harvesting truck and are coupled to it, subsequent to which a winch and T-bar are extended from the shuttle truck into the harvesting truck to draw, in a single pull, all of the filled containers onto a roller grid in the bed of the shuttle truck. The shuttle truck is then driven to the truck or railroad freight depot where the containers are removed by sliding them off the roller grid and the truck returns to the harvesting site.

19 Claims, 30 Drawing Figures

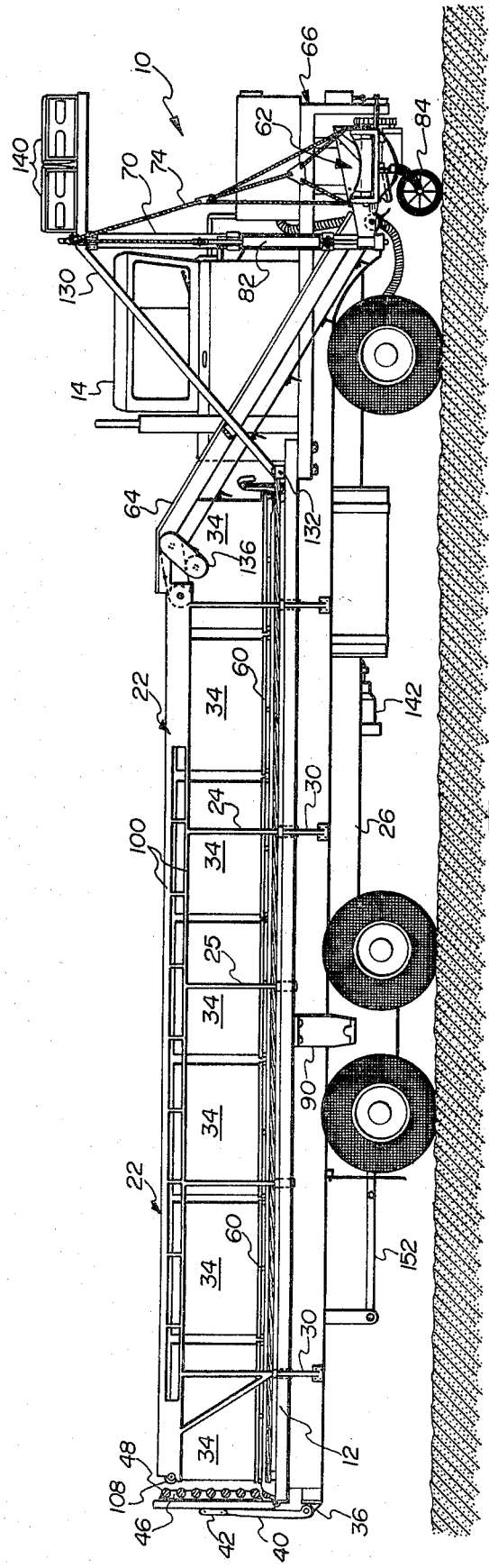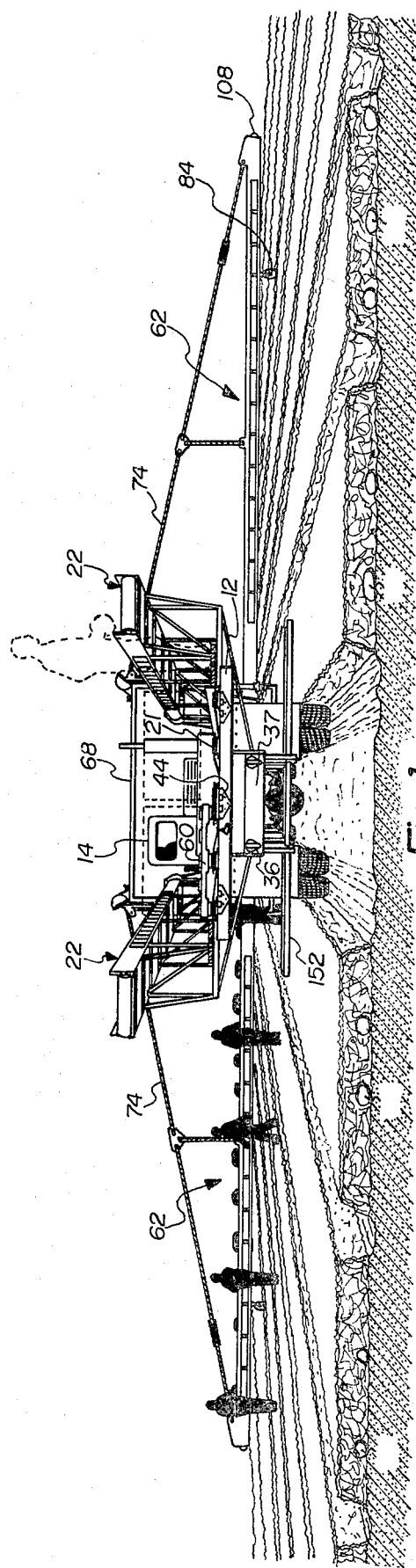

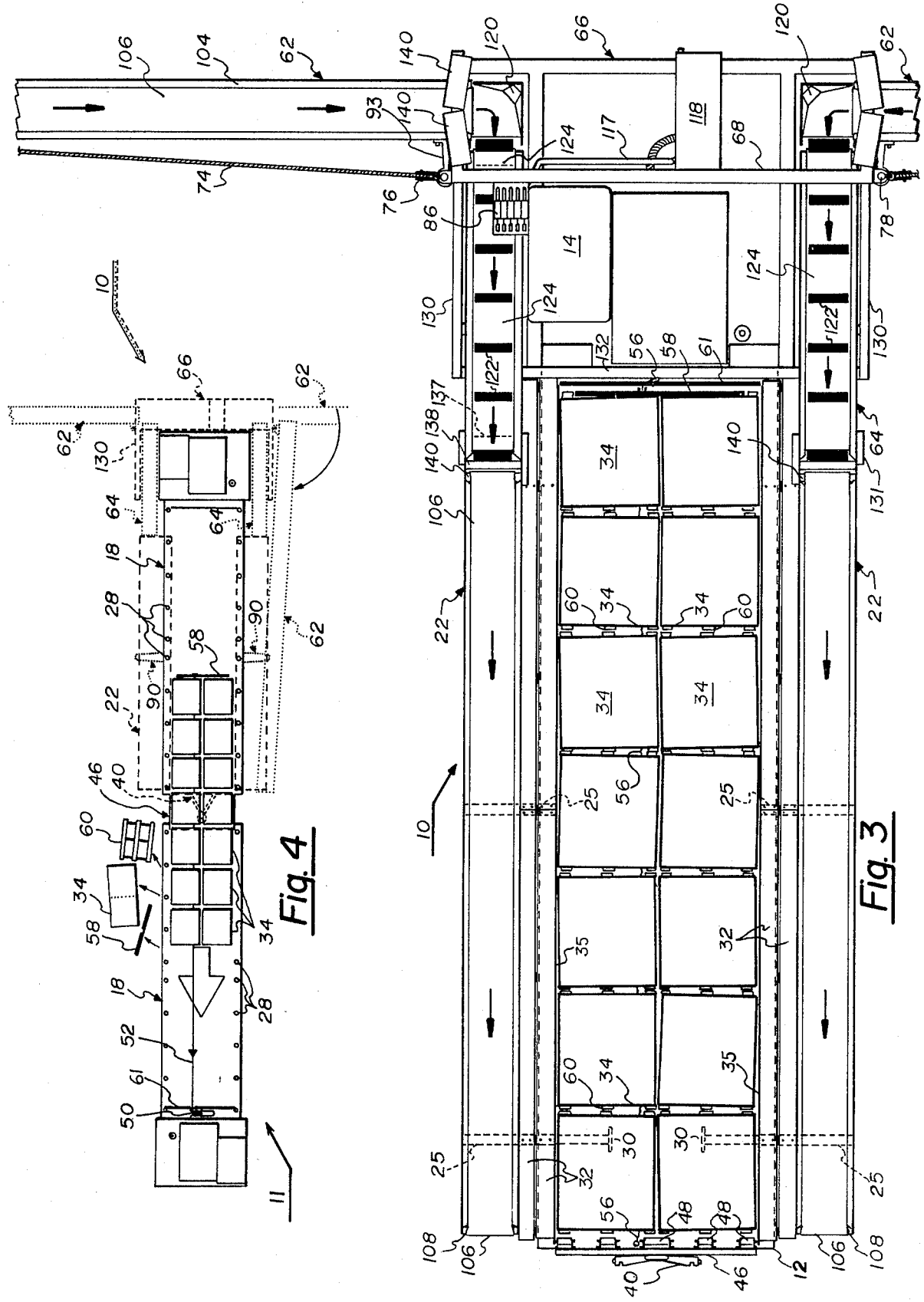

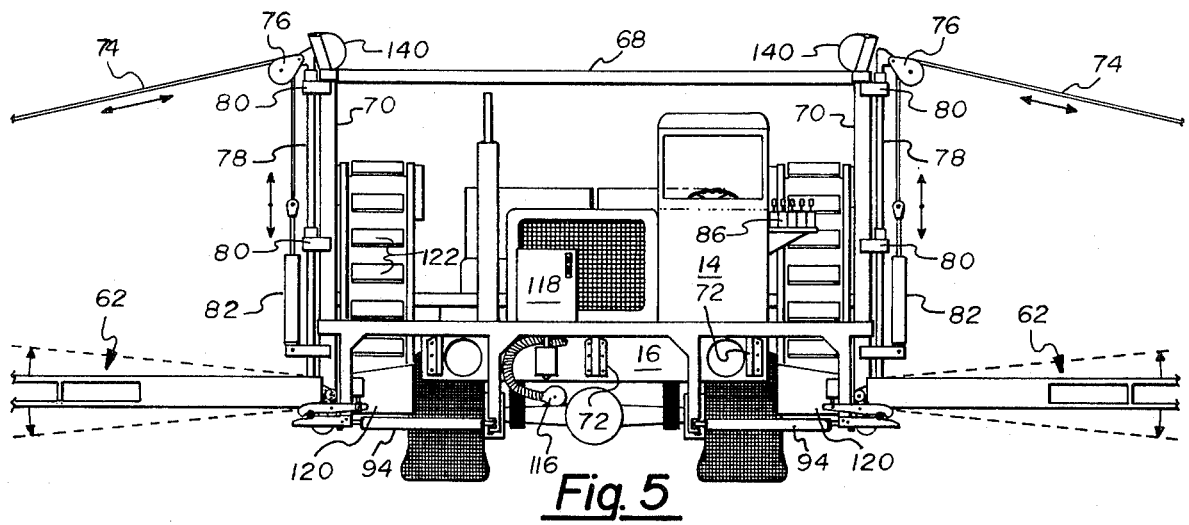
Fig. 5
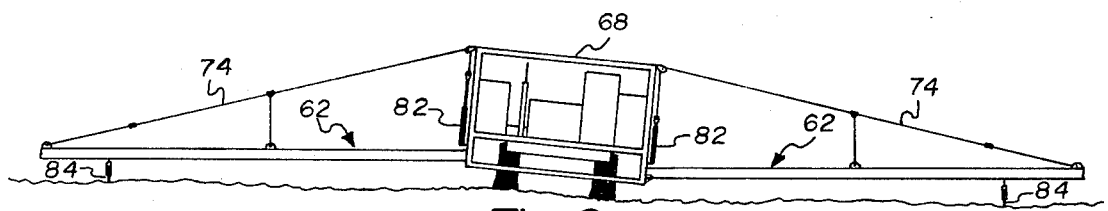
Fig. 6
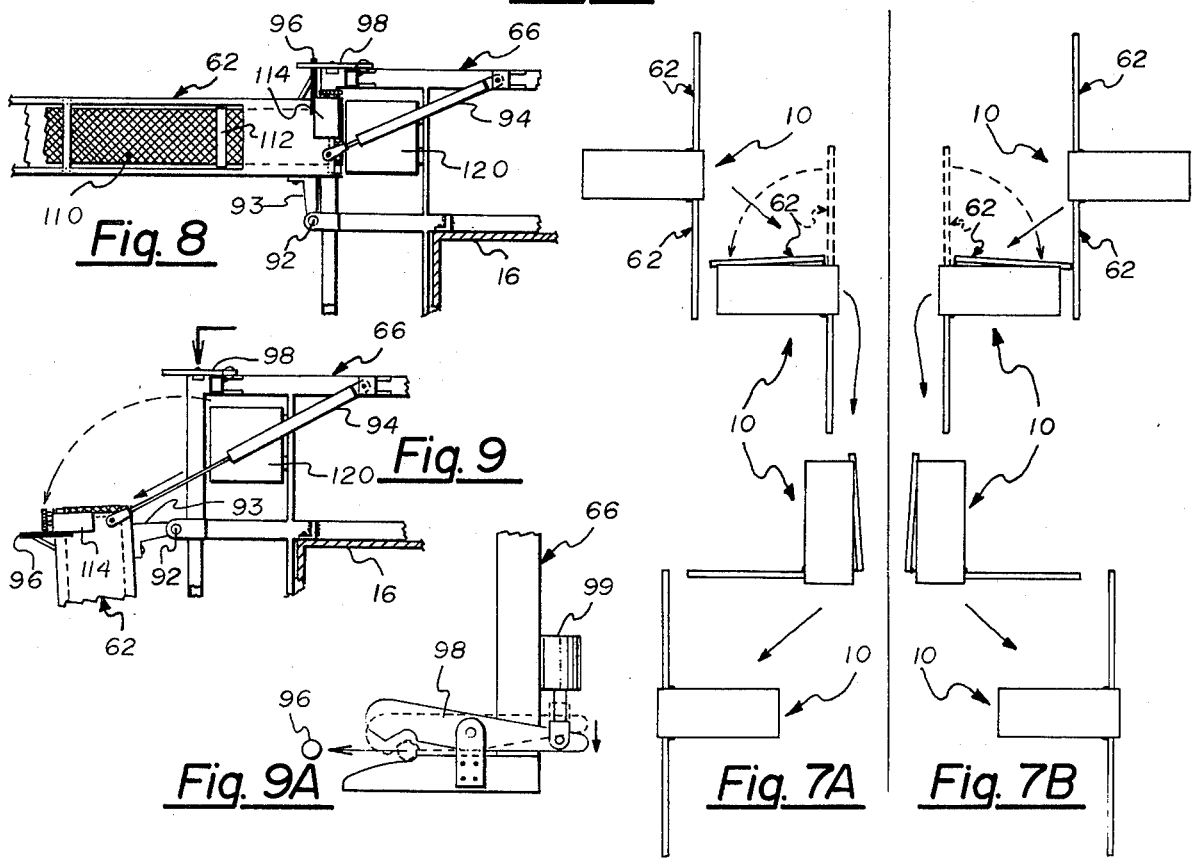
Fig. 8
Fig. 9
Fig. 9A
Fig. 7A
Fig. 7B

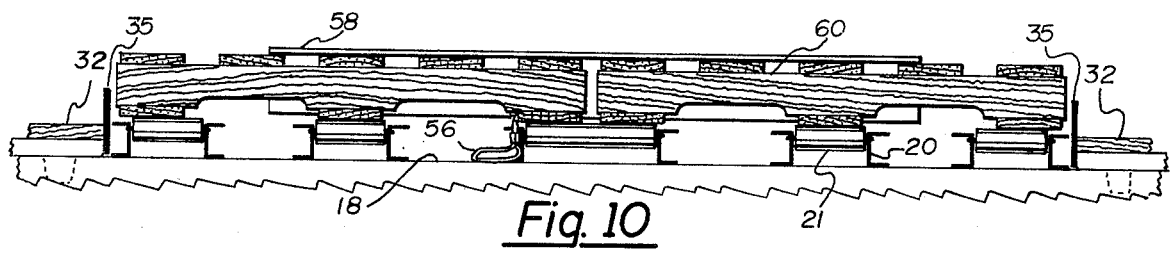
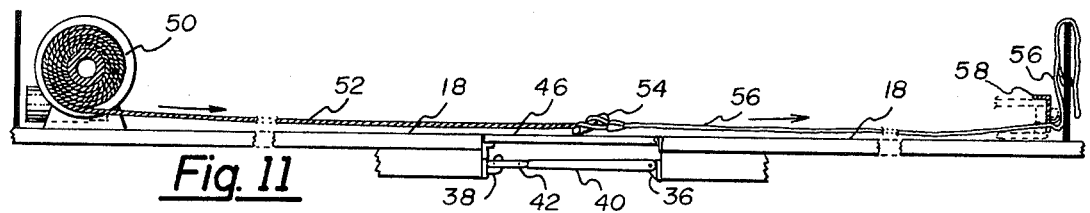
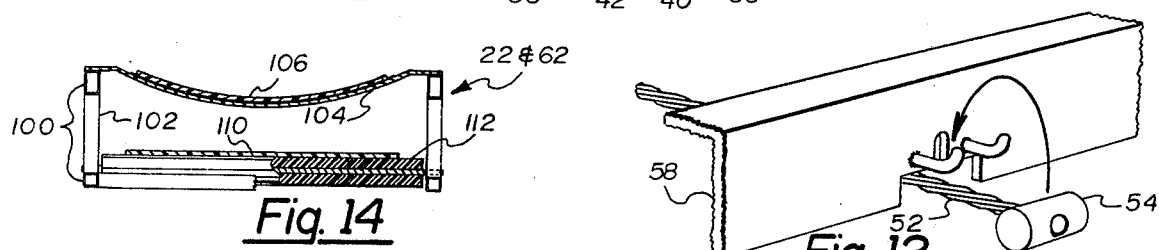
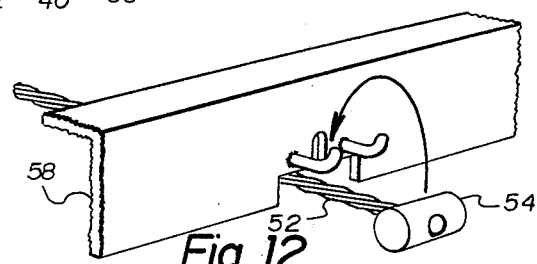
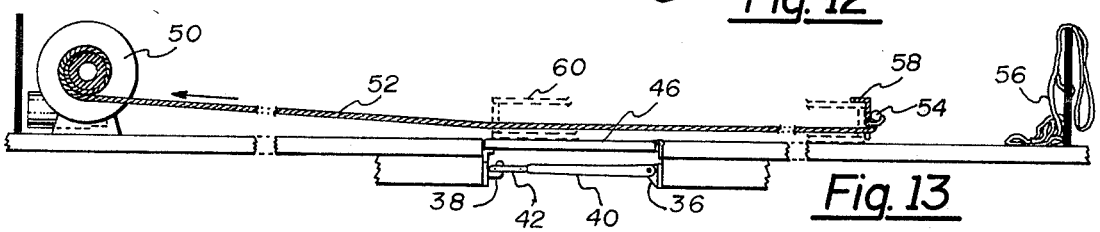
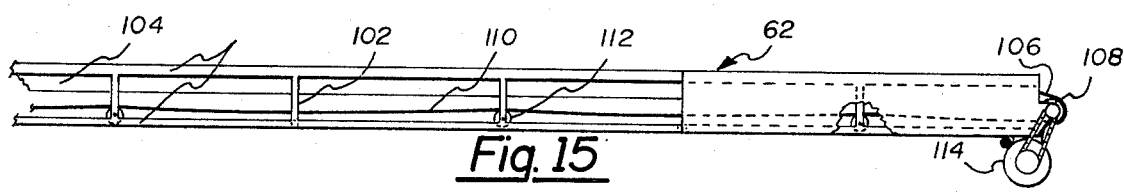
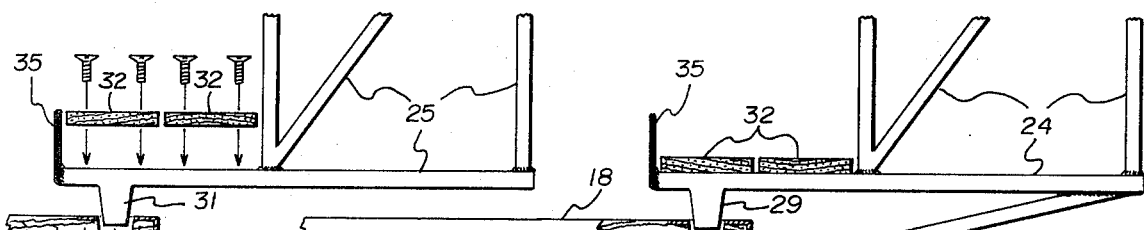
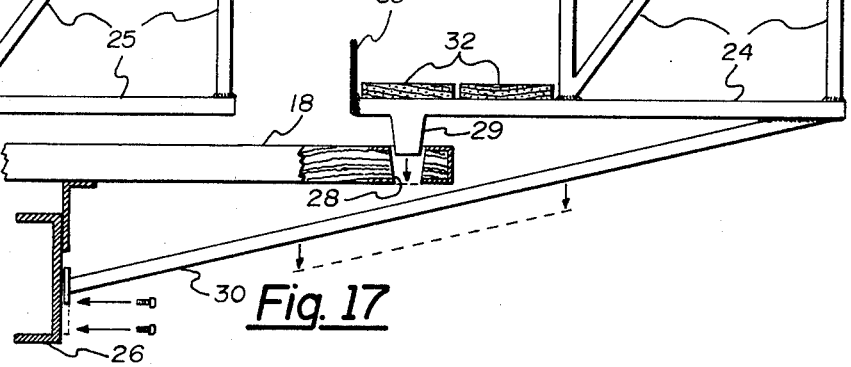

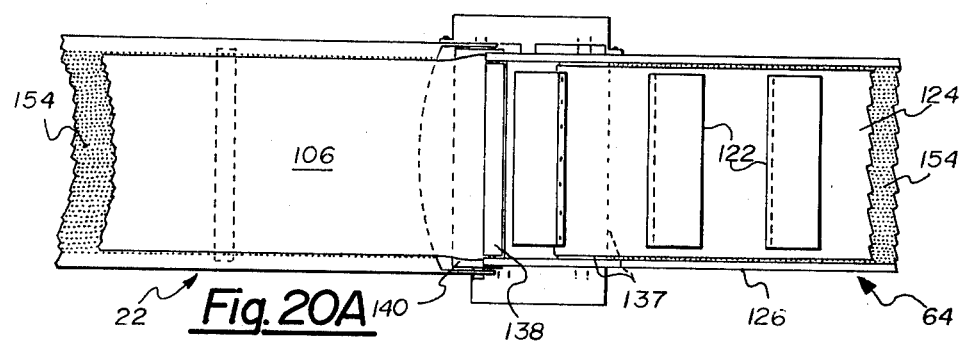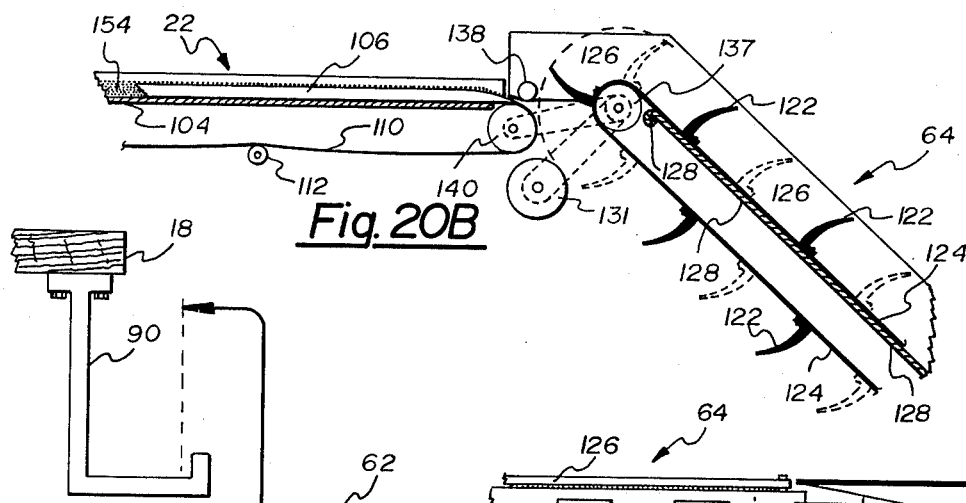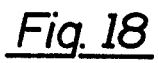
Fig. 18
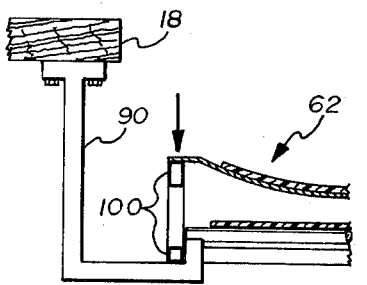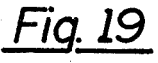
Fig. 19
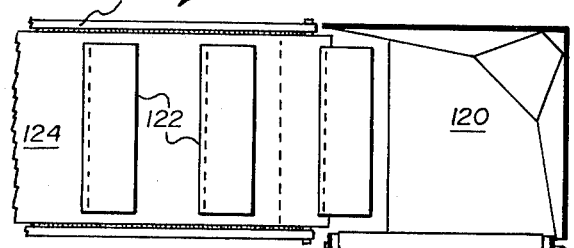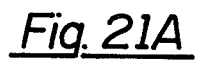
Fig. 21A
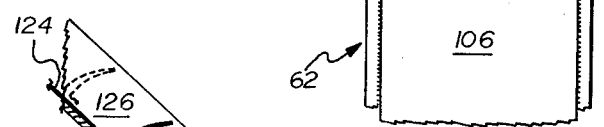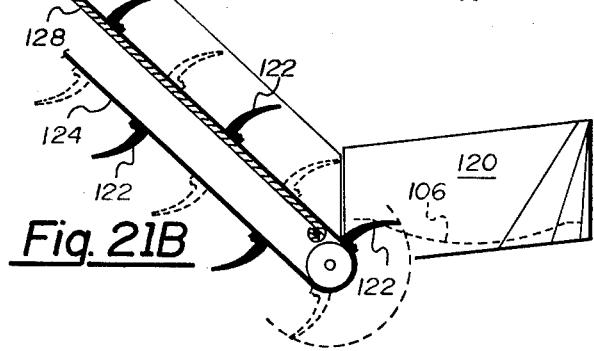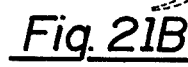
Fig. 21B

FIELD CROP HARVESTING AND LOADING MACHINE

BACKGROUND OF THE INVENTION

The present invention was developed particularly toward the specific needs of watermelon harvesting, and the description will pertain principally to watermelons although the machine and system is equally usable, and will be used, on other field crops.

Watermelons are currently harvested and taken to the freight depot as follows. First, as a preliminary measure, field laborers called "cutters" move through the fields, locating all ripe melons and cutting their vines and turning them with the yellow side up so that the pickers will know which ones to pick. After this is done, an open truck is driven through roads that are put in the fields between every group of ten rows and field laborers lift the melons into the truck. This is done by the field laborer furthest from the truck picking up the melon in his part of the melon patch and throwing it to the next field hand, so that a bucket-brigade chain is formed, the last link of which is a worker in the truck bed who puts it in the open bed.

There are at least three serious flaws with this process that the instant invention solves. First, obviously only the strongest and healthiest field workers may be used due to the rigor of lifting and tossing, or receiving a tossing, hundreds and hundreds of watermelons all day long. During the harvest season, workers of this type may be hard to come by and may be expensive. Other workers who may be readily available may not have the requisite strength and endurance for the harvest.

Secondly, because some of the melons are handled several times as they are passed from worker to worker and finally tossed up into the worker in the truck, the attrition or loss rate of the melons runs about 10% due to cracking and other damage. Watermelons are actually fairly fragile and should be handled in a manner more delicate than this procedure is capable of.

The third problem with this harvesting system is that once the truck is full of melons, it is replaced with another empty truck and driven to the freight depot where again strenuous manual labor must be exerted to move the melons from the truck bed to the containers in which they are shipped.

As the number and complexity of government regulations, contributions, deductions and payments rises, as does minimum wage, union strength and labor problems, the incentive to ameliorate the above-described highly labor-intensive process rises.

SUMMARY OF THE INVENTION

Born of these economic forces and designed to resolve the above-stated problems is the instant invention. The harvester truck which passes slowly along the field road has laterally extended conveyors into which the field workers deposit the cut watermelons (or other crop), which is much less strenuous than tossing the melons from one person to the other, and thus allows for virtually any field hand, even women, to work in this capacity. The lateral or wing conveyors convey the watermelons into the truck where they are engaged on the cleats of a pair of elevator conveyors and then dropped gently on a pair of sorting conveyors longitudinally extending along the sides of the truck.

The truck bed contains a wide roller grid down its center with standing room defined between the grid and the two sorter conveyors. Two rows of palletized shipping containers are carried on the roller grid, and a worker stands on each side of the containers, loading them from the sorting conveyors.

Once the containers are full, one of several shuttle trucks, which are the same type of truck as the harvesting truck but without any accessory equipment which is mounted on the harvesting truck except for the roller grid, backs up to the harvesting truck and is mated thereto by a swinging positioning bar and a tailgate with a roller grid on it. Each of the shuttle trucks has a winch next to the cab with a T-bar on the end of a cable, and the T-bar is extended through the two rows of containers on the harvesting truck and engaged across their front. When the winch is energized, it draws the cable along with all of the containers from the harvesting truck onto the roller grid of the shuttle truck and the containers are taken to the loading depot and removed by forklift from the side.

Thus, by the utilization of the containers directly in the harvesting truck in the field, the secondary process of unloading the melons from the truck into containers at the freight dock is virtually eliminated, resulting in the saving of about 50% of the labor required for the entire process, beginning with the field loading and terminating in the unloading of the containers at the dock.

BRIEF DESCRIPTION OF THE DRAWINGS

FIG. 1 is a rear elevation view of the harvester truck;

FIG. 2 is a right side elevation view of the harvester truck;

FIG. 3 is a top plan view of the harvester truck;

FIG. 4 is a top plan view illustrating the container transfer;

FIG. 5 is a front elevation view of the harvester

FIG. 6 is a diagrammatic front view of the harvester showing its wing leveler function;

FIG. 7(a) is a diagrammatic representation of a right turn of the harvesting truck;

FIG. 7(b) is a diagrammatic illustration of a left turn of the harvesting truck;

FIG. 8 is a detail of the wing conveyor deployment system;

FIG. 9 is similar to the conveyor of FIG. 8 but having the conveyor rearwardly extended;

FIG. 9(a) is a detail of the wing conveyor break-away latch;

FIG. 10 is a rear view of the roller grid and pallet construction showing the transfer brace in place;

FIG. 11 illustrates the laniard deploying the off-load cable;

FIG. 12 illustrates the attachment of the T-bar to the transfer brace;

FIG. 13 is a diagrammatic illustration of the load in transfer showing the coupling of the vehicles together;

FIG. 14 is a section of the wing conveyor;

FIG. 15 is a front elevation view of a portion of a wing conveyor;

FIG. 16 is a diagrammatic partially exploded illustration of the first type of frame used to mount the sorting conveyors of the truck bed;

FIG. 17 illustrates a second type of frame used to mount the sorting conveyors to the truck frame and bed;

FIG. 18 illustrates the wing conveyor rearwardly extended prior to being engaged on its stowage hook;

FIG. 19 is similar to FIG. 18 after stowage;

FIG. 20(a) is a top elevation view of the elevator conveyor meeting the sorting conveyor;

FIG. 20(b) is a side view similar to FIG. 20(a) but diagrammatic;

FIG. 21(a) is a top elevation view of the juncture of the wing conveyor and elevator conveyor showing the turning bin;

FIG. 21(b) is a diagrammatic side elevation view of the structure of FIG. 21(a);

DETAILED DESCRIPTION OF THE PREFERRED EMBODIMENT

Figure 22:
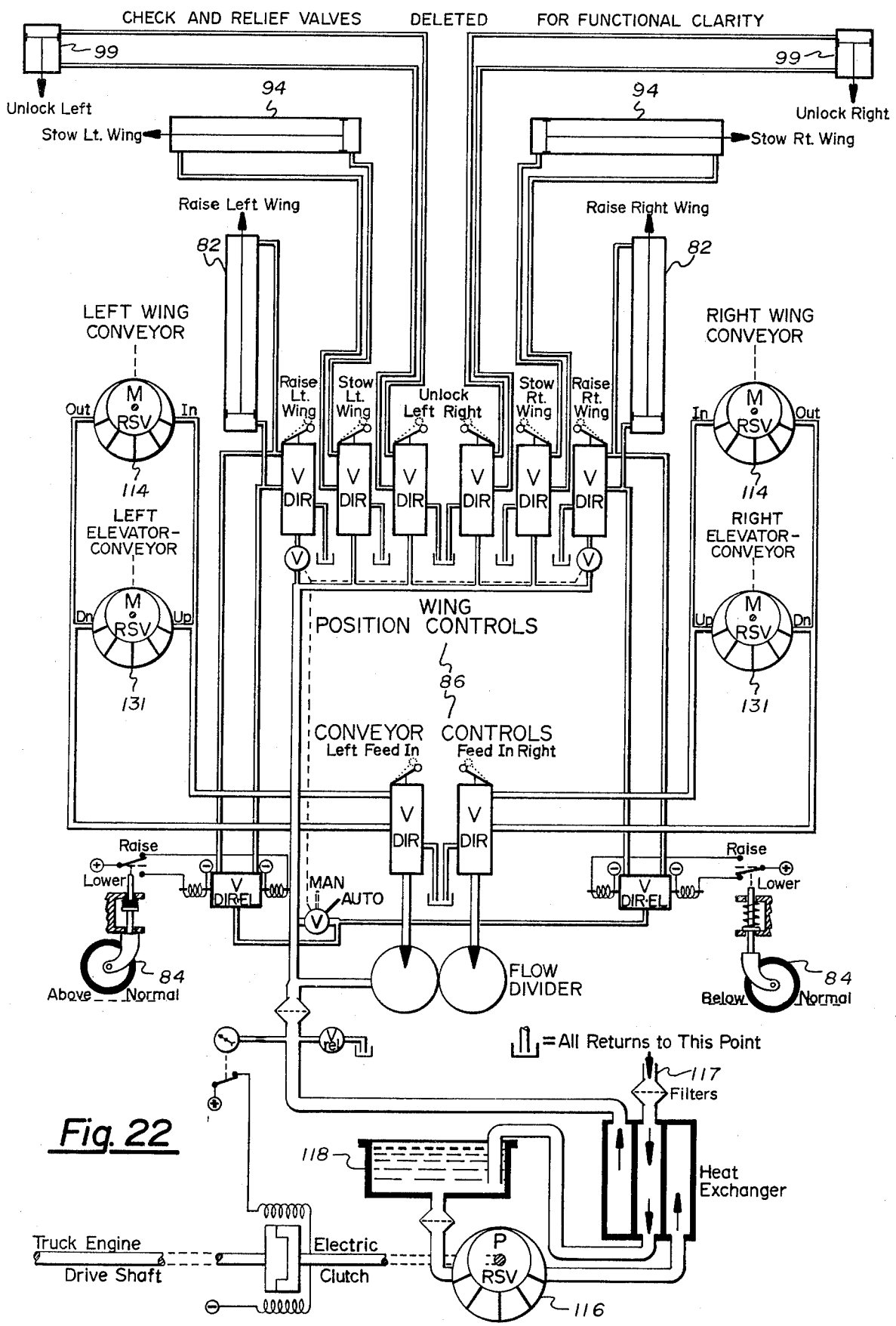
FIG. 22 is a schematic of the hydraulic operating mechanism.

The harvesting system utilizes several trucks which are modified in one case to be a harvester truck and in other cases to be shuttle trucks. FIGS. 1 through 3 illustrate in detail the basic truck 11 to which the appurtenant structure is mounted to convert it into a harvester truck 10. The truck 10 has a long, flat bed 12, a cab 14 and a front bumper 16, with the bulk of the appurtenant structure converting it to a harvester being mounted to either the flat bed 12 or the bumper 16. In general, the structure mounted to the framework which is in turn mounted to the front bumper petains to the conveyor mechanism utilized for transporting melons from the fields to the sorting conveyors, and the sorting conveyor together with the off-loading structure are mounted on the truck bed. The truck bed mounted portion of the harvester and its operation will be described first.

The elongated bed of the truck is shown in FIG. 10 at 18. A roller grid is permanently mounted to the bed of the truck and in the disclosed embodiment comprises several longitudinal stringer beams 20 between pairs of which are axled rollers 21, the central roller being wider than the others to span the inner edges of two overlying pallets. The roller grid, which can be seen between containers in FIG. 3, may be permanentaly attached to the truck bed because it is used both in the beds of the harvester truck and the shuttle trucks. As will be emphasized throughout this discussion, the trucks used for harvesting and for shuttle trucks are carefully maintained the same except for removable structure so that they may be innerchanged in the case of a breakdown of the harvester truck.

Elevated along both sides of the harvester truck bed are a pair of sorting conveyors 22 which can best be seen in use in FIG. 1. These conveyors are supported on two basic framing members 24 and 25. Frame structure 24 is best seen in FIG. 17 and frame 25 is shown in FIG. 16. The sorting conveyors are each removably attached to the bed 18 of the truck and underlying support beams 26 as shown in FIGS. 16 and 17, with the stake pockets 28 in the truck bed receiving studs 29 and 31 depending from the frame structures. Angular support is provided by a brace 30 provided by each of the frames 24 and bolted to the beam 26. Duck boards 32 are bolted to the frame structure to provide a standing area for workers who are loading melons (or other crops) from the sorting conveyors into the containers 34, and guides 35 ensure smooth unloading of the containers.

At the rear of the truck certain modifications are made to permit the mounting of structure of facilitate mating the harvester truck to the shuttle trucks. This structure includes a pair of eyelets 36 which are removably bolted to the rear of the harvesting truck as seen in FIGS. 11 and 14. The eyelets are used to releasably engage the connector pins of an A-shaped stabilizing bar 40 having an outer eyelet 42 which engages the hook 38, removably bolted to the rear of the shuttle truck to steady it and mate the two trucks together during the transfer process about to be described.

Other structure are the hinge plates 44 mounted to the back of the truck bed as seen in FIG. 1 into which a bridge gate 46 seen in FIG. 2 is attached when the truck in question is used as the harvesting truck. Note the bridge gate has a roller grid 48 covering its top.

The receiver, or shuttle trucks are the same basic truck as the harvesting truck and may have the mounting parts for the harvesting appurtenances built in, but otherwise have none of the harvesting superstructure except for the roller grid. In addition, a winch 50 is mounted at the front of the truck bed, operative on a cable 52 with a T-bar 54 at the end. In use, a laniard 56 is entrained between the two rows of containers from front to back with a loop at the back which engages the T-bar 54 as shown in FIG. 11 at the loading site. Note in FIG. 11 the attachment of the stabilizing bar 40 over the hook 38 and the deployment of the bridge gate 46 to define a continuous roller grid in and between both mated trucks.

The T-bar is drawn between the containers 34 and engaged in a brace 58 detailed in FIG. 12. The brace spans both of the pallets 60 as shown in FIG. 13, the winch is activated, and the pallets are drawn off in a single motion as shown in FIG. 4, transferring the entire pallet load at once. Both tracks have a stop 61 mounted to the bed to delineate the forwardmost positions of the containers. Note the T-bar, container and pallet above the truck in FIG. 4, indicating that when the shuttle truck returns to the field it must bring a fresh supply of pallets and containers, plus one brace 58 to replace those removed during the last trip. The original brace which ws used to transfer the pallets is retained with the shuttle truck to securely hold the containers in place as they are transported to the shipping depot. Once the trucks are disengaged, the bridge gage 48 and the bar 40 may be elevated into their out-of-the-way position shown in FIG. 2.

The above described method represents about half of the entire process disclosed and claimed herein, and as described in the background represents a tremendously advantageous departure from the techniques in previous use to harvest melons and other field crops. The containerization of crops in the field, together with the dual-truck system for continuous removal and transport of containerized crops from the harvesting truck to the shuttle truck, represents a significant reduction in the required labor during the harvest process.

Attention is now directed toward the structure on the forward part of the vehicle which conveys watermelons from the field onto the already described sorting conveyors 22. Basically this structure comprises wing conveyors 62, which bring the fruit adjacent the truck, and elevator conveyors 64 which lift the fruit from the wing conveyors to the sorting conveyors. Most of the structure is supported on a forward frame 66 which is mounted on the front bumper 16. The forward frame includes an upper crossbeam 68, a pair or uprights 70, another crossbeam directly below beam 68 which is not visible in the drawings but which passes across the top of the bumper 16 and is mounted to the bumper by means of flanges 72 bolted to the bumper, and various other beams and arms extend from the basic forward frame 66 to support the different components of the apparatus.

The wing conveyors are best seen fully extended in FIG. 1. These conveyors are supported by cables 74 which pass through pulleys 76 supported on a vertical pivot rod 78 pivotally mounted in brackets 80 to the upright frame members 70. The inboard end of these cables are each connected to a hydraulic cylinder 82. Near the end of each of the wing conveyors is a height sensor 84 which automatically operates an electric valve mechanism, not shown, to control the hydraulic cylinder 82 and ensure the wing conveyors do not get too high or too low over the fields. This action is illustrated in FIG. 6. The automatic control feature can be overridden by a manual control, which is one of the controls in the hydraulic console 86, which is mounted to the side of the truck cab 14 to be accessible to the operator.

As all of the fixtures mounted to the pivot rod 78 will swing concomitantly, the hydrulic cylinders 82 and the pulleys 76 will rotate rearwardly smoothly when the wings are swung into their rearwardly extended, stowed position. In this position the conveyors are raised, and then dropped, onto the stowage hooks 90, best shown in FIGS. 18 and 19, by the hydraulic cylinders.

Forward and rearward swinging action of the wing conveyors is made possible by virtue of their vertically pivotal attachment to the frame 66 at 92 by arm 43, best shown in FIGS. 8 and 9. Rearward actuation for stowage or forward actuation for operative deployment of the wing conveyors is effected by wing conveyor deployment hydraulic cylinders 94 pivoted at both ends between the forward frame and the conveyors.

In its forward position the wing conveyor is locked in place by virtue of the engagement of the latch bar 96 in the breakaway hydraulically-actuated latch 98, operated either automatically by the same control that actuates cylinders 94, or independently operated by a control in the console 86. Note this breakaway latch can be forceably unlatched in the event the harvesting truck brings one or both of the wing conveyors against an obstacle, thereby preventing damage to the conveyor assembly or the truck. The breakaway latch, detailed in FIG. 9(a), can be shown in this position on the forward frame in FIG. 5. This figure also shows the positioning of the conveyor deployment cylinders 94.

The structure of the wing conveyor is representative of the other conveyors, and it will be the only one described in detail in the Specification. The duplicated parts of the sorter and wing conveyors are numbered identically. Turning to FIGS. 14 and 15, basically the wing conveyor comprises a box-shaped frame having four longitudinal corner spars 100 maintained in position at the sides and bottom of the conveyor by spaced supports 102. A shaped belt bed 104 attached between the entire length of the top spars is concave in cross section as can be seen in FIG. 14, and thus supports the belt 106 in this shape. At the ends of the conveyors are terminal rollers 108, and the return portion of the belt, shown at 110 is supported by spaced return rollers 112.

At the inboard end of the conveyor is a hydraulic motor 114 which belt-drives the inner terminal roller 108 as shown in FIG. 15. The motor 114 is driven by hydraulic hoses, not shown, connecting the motor to shaft-driven electrical clutch pump 116 and returning fluid through return line 117 to hydraulic return tank 118. All of the conveyors and the other hydraulic structures are powered in the same fashion and are controlled either automatically as described, or otherwise at the control console 86, and all conveyor belt support surfaces are coated with Teflon or other anti-friction coating 154.

When in use harvesting, the transition between the wing conveyors 62 and the elevator conveyors 64 is made in a "turn box" 120, which is basically a curved ramp leading from the inboard edge of the wing conveyor to the bottom of the elevator conveyor. The floor slopes downwardly so that melons or other fruit introduced into the turn box will roll to the bottom, where they are picked up by the cleats 122 of the elevator conveyor belt 124. The turn box may be seen in FIGS. 3, 8, 9 and 21(a) and (b).

The elevators have a pair of side walls 126 with a belt support floor 128. The elevator is bolted to the forward frame 66 at its bottom and at an intermediate position is bolted to the diagonal support brace 130 connected between crossbar 132 (of which there are two) mounted to the truck bed and the upper crossbar 68 of the forward frame. The upper end of the elevator is braced against the frame of the sorting conveyor and at this end a hydraulic motor 131 drives the upper terminal roller 137 of the elevator and also the forward roller 140 of the sorting conveyor. A small, additional idler roller 138 journaled between the sidewalls of the elevator as shown in FIG. 20(b) expedites the smooth passage of the melons from the elevator to the sorting conveyor. Whereas the remander of the structure is either connected to the rear portion of the truck, or to the front frame 66, the elevators and the brace 130 span between the forward and after structure of the vehicle.

Other features in structure not previously touched upon include high intensity halogen lights 140 which are required because much of the harvesting is done at night time, as the day produces temperatures too hot to safely harvest in the desert regions in which the melons are grown.

As can be seen in FIG. 2, on an auxiliary transmission 142 positioned in the drive train having three shift ratios enables the speed of the truck to be dropped to as little as 30' a minute, as compared with 65' a minute, which is the minimum for the truck without modification.

The harvester as above-described is ideal for harvesting melons and other large crops. However, the transitions between conveyors may need modification in the event smaller units are harvested, such as tomatoes. In this event, the sequence of drawings from FIGS. 23 through 26 illustrates the handling of the transitions between conveyors.

Figure 23:
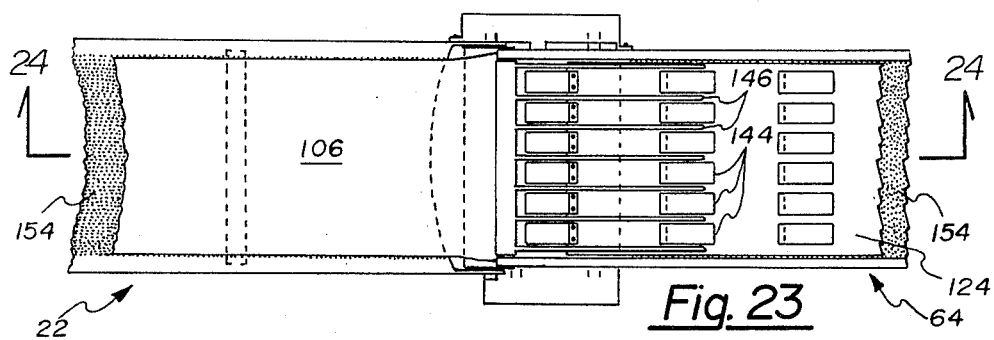
FIG. 23 is a top elevation view of a modified elevator conveyor used for small crops.
Figure 24:
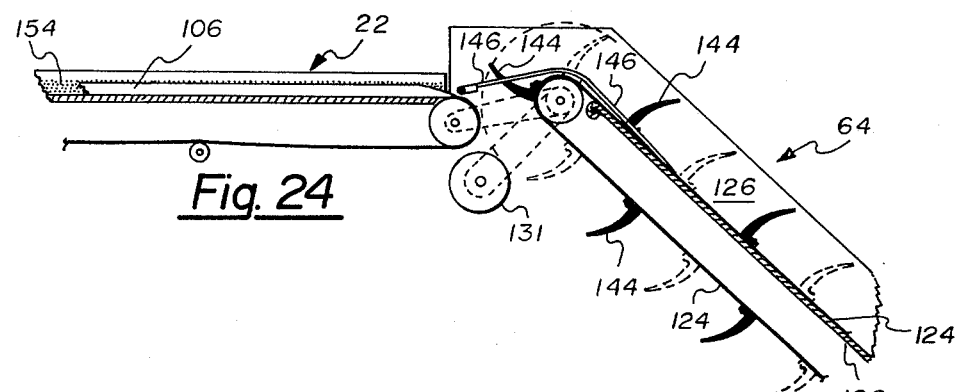
FIG. 24 is a side elevation view of the structure of FIG. 23.

FIGS. 23 and 24 indicate a plurality of subdivided cleats 144 comprising each of the original cleats, and between these spaced cleats lie independently pivoted, sprung-steel tines 146. Note in FIG. 24 that due to the angle shown the cleats are capable of pushing objects along the tine almost to the pivoted end thereof.

Figure 25:
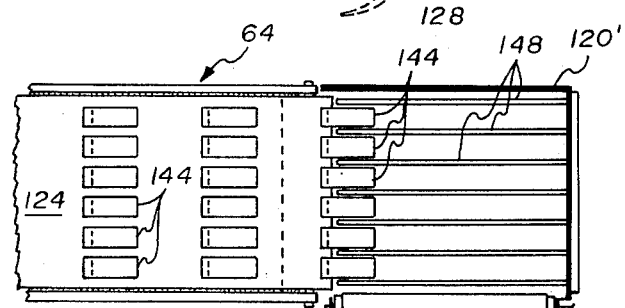
FIG. 25 is a top elevation view of a modification of FIG. 23 but at the juncture between wing conveyor and elevator conveyor.
Figure 26:
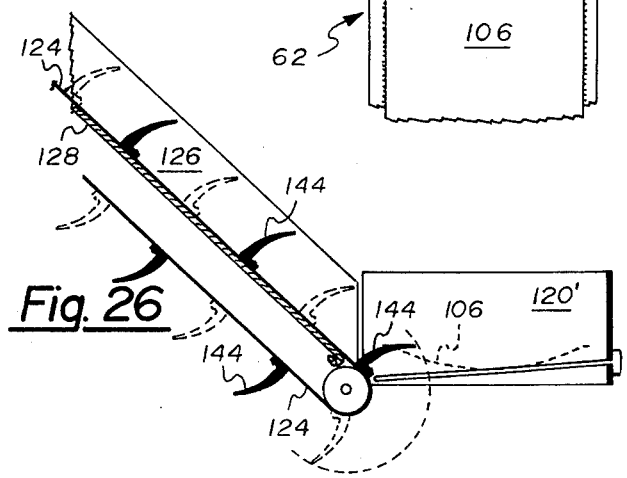
FIG. 26 is a diagrammatic side elevation view of the subject matter of FIG. 25.

The operation of the turn box is shown in FIGS. 25 and 26 utilizing smaller fruit, wherein rather than having a flat bottom the box utilizes high-tension steel rods 148, again passing between the segmented cleats 144. There also could be some modification in the containerization and loading procedures in the bed of the truck, such as the addition of an automatic container loading system to replace the laborers which are onboard the truck during the harvesting of melons and other large unit crops.

The ability of the wing conveyors to swing parallel to the truck body enable it to travel on the roadways of the country. It is anticipated that these trucks would move northward as the harvest season of a particular crop progresses to extend the useful time of the process. However, another instance of the need to have the pivotal wing conveyors is shown in FIGS. 7(a) and 7(b) wherein in making either a left or right turn immediately adjacent a traveled roadway or other obstacle, the outboard wing can be swung in to clear the obstacle.

Another feature which should be mentioned is the pallet support rack 152 mounted beneath the harvester truck which will hold several extra pallets in the event the shuttle truck turns up short or pallets are broken during use.

The hydraulics which operate the power and control aspects of the apparatus are schematically outlined in FIG. 2. Raising, lowering and stowing of the wing conveyors, releasing the breakaway latch, and automatic wing height control mechanisms are disclosed in that figure. Power and speed monitors control wing conveyor motors 114 and elevator conveyor motors 131, utilizing separate motors for left and right functions.

Other features of the invention or modifications of the means or method disclosed within this specification for accomplishing the objectives stated are intended to be within the scope of the attached claims.

We claim:
1. A field crop harvesting machine comprising:
 (a) a vehicle body;
 (b) said body defining a generally flat loading bed having a central, longitudinally extended container area with a low friction floor and a longitudinal standing area extended along both sides of said container area;
 (c) a pair of generally horizontal longitudinal sorter conveyors mounted to said vehicle just out board of the respective standing areas to permit workers positioned on said standing areas to load harvested crops from said sorter conveyors to a container in said container area;
 (d) a crop collector conveyor system mounted on said vehicle body having wing conveyors extending generally horizontally over the field to permit easy loading of the crops from the field therein, and also having elevator conveyors for delivering crops from said wing conveyor to said sorter conveyors;
 (e) the rear end of said vehicle body being adapted to mate with the rear end of a shuttle having a low friction receiving bed whereby said machine can be driven through the fields, crops placed in said wing conveyors by field workers and conveyed into said sorter conveyors, loaded into containers in said container area from both sides by workers in said standing areas, and when containers in said container areas are full, smoothly sliding said containers straight back into the receiving bed of a shuttle; and
 (f) each of said wing conveyors is pivoted at its inboard end about a vertical axis and can be swung rearwardly substantially parallel alongside said vehicle body for transport, and including stowage hooks on the left and right side of said vehicle body for engaging said conveyors for transport and hydraulic actuators for swinging said wing conveyors forwardly or rearwardly for alternative stowage or deployment and including breakaway latches for releasably securing said wing conveyors in their laterally deployed positions to prevent structural damage upon encounter of said wing conveyors with an obstacle.

2. A field crop harvesting machine comprising:
 (a) a vehicle body;
 (b) said body defining a generally flat loading bed having a central longitudinally extended container area with a low friction floor and a longitudinal standing area extended along both sides of said container area;
 (d) a crop collector conveyor system mounted on said vehicle body having wing conveyors extending generally horizontally over the field to permit easy loading of the crops from the field therein, and also having elevator conveyors for delivering crops from said wing conveyor to said sorter conveyors;
 (c) a pair of generally horizontal longitudinal sorter conveyors mounted to said vehicle just outboard of the respective standing areas to load harvested crops from said sorter conveyors to a container in said container area;
 (e) the rear end of said vehicle body being adapted to mate with the rear end of a shuttle vehicle having a low friction receiving bed whereby said machine can be driven through the fields, crops placed in said wing conveyors by field workers and conveyed into said sorter conveyors, loaded into containers in said container area from both sides by workers in said standing areas, and when containers in said container areas are full, smoothly sliding said containers straight back into the receiving bed of a shuttle vehicle; and
 (f) a ground sensor mounted beneath each of said wing conveyors and wing conveyor elevation means actuated respectively by the ground sensors to raise or lower said wings to within predetermined tolerances of an established height above the field.

3. A harvesting, palletization, containerization and local transport system for field crops comprising:
 (a) a harvester truck having a loading bed;
 (b) a plurality of shuttle trucks each having a loading bed and a rear end mateable with the rear end of said harvester truck such that when mated said beds establish mutual continuity;
 (c) each of said beds being dimensioned to accept at least one longitudinal row of palletized containers and each having a conveyor means to permit the free longitudinal movement of palletized containers therealong;
 (d) said harvester truck having a conveyor system to bring harvested crops picked from the fields alongside said loading bed, whereby harvested crops can be loaded into palletized shipping containers in the loading bed of said harvester truck, and the containers thus filled can periodically be drawn into the bed of a shuttle truck mated to the rear thereof, taken to a freight depot, slid out of the shuttle truck and shipped directly in the palletized containers.

4. Structure according to claim 23 wherein said conveyor means comprise roller beds with laterally journalled rollers to facilitate longitudinal movement of containers thereon, and the rear end of said harvester truck includes a tailgate on a horizontal axis pivoted from an upright position serving as a back for said harvester truck loading bed to a substantially horizontal lowered position to mate with the rear end of a shuttle truck said tailgate having a laterally journalled roller bed therein to smoothly bridge between said harvesting truck and said shuttle truck.

5. Structure according to claim 4 and including a stabilizing bar pivoted to the rear end of said harvester truck back below said tailgate and being pivoted from a generally upright position to a rearwardly deployed position, said bar having means at its distal end to temporarily engage when deployed the rear end of a shuttle truck to maintain same at the proper spacing from said harvesting machine.

6. A harvesting and local transport system for field crops utilizing a plurality of substantially identical trucks any one of which is adaptable to become a field crop harvester with the balance of the trucks being shuttle trucks, said system comprising:
 (a) a plurality of substantially identical trucks each having a loading bed with conveyor means therein disposed at substantially the same height and having mateable rear ends for facilitating the free longitudinal movement of containers therebetween;
 (b) one of said trucks being designated a harvester truck and the rest of said trucks being shuttle trucks, said harvester truck having a pair of longitudinally extended sorter conveyors removably mounted along opposite sides of the bed;
 (c) a pair of conveyor assemblies removably mounted to said harvester truck on opposite sides thereof and having wing conveyors extending laterally outwardly from said harvester truck over the field and also having elevator conveyors for delivering crops from said wing conveyors to said sorter conveyors; and
 (d) powered means for translating containers from the loading bed of said harvester truck to the loading bed of the respective shuttle truck whereby said conveyor assemblies and sorter conveyors can be removed from said harvester truck and installed on one of said shuttle trucks such that the latter becomes the harvester truck.

7. Structure according to claim 6 wherein said harvester truck has means for releasably engaging any of said shuttle trucks in fixed back-to-back relation to facilitate loading containers from said harvester truck to the respectively engaged shuttle truck.

8. Structure according to claim 7 wherein said engagement means comprises a stabilizing arm removably pivotally mounted to the rear end of said harvester truck, said arm having an eyelet at the distal end thereof, and said shuttle trucks each having a hook positioned at the rear end thereof to engage said eyelet to permit stabilizing said harvester truck and shuttle truck at a predetermined spacing.

9. Structure according to claim 6 wherein each of said trucks is provided with tailgate mounts to releasably mount a tailgate thereto, said conveyor means comprises laterally journalled rollers defining a roller bed in said loading bed, and include a tailgate having rollers thereon defining an extension of said roller bed when mounted to said tailgate mounts.

10. Structure according to claim 6 wherein each of said trucks has stake pockets and said sorter conveyors are mounted on frames having studs engaged in said stake pockets and braces bolted to said designated harvester truck.

11. Structure according to claim 9 wherein said frames extend laterally beyond the edges of the truck designated the harvester truck and define walkways alongside said loading bed to accommodate workers transferring field crops from said sorter conveyors to containers disposed in said loading bed on said conveyor means.

12. Structure according to claim 6 wherein said conveyor assemblies are mounted on a framework and said trucks each have a front bumper, and each of said bumpers and said framework has means for a mutual releasible inter engagement.

13. Apparatus for converting a flat loading bed truck with a central roller bed therein dimensioned to carry palletized containers into a harvesting machine with an on-board container loading system, said apparatus comprising:
 (a) a crop collector conveyor system, and means powering same, including a frame with means to attach same to said truck, laterally extended wing conveyors, elevator conveyors positioned to transport crops from the inboard ends of said wing conveyors to an elevated position behind the truck cab and over the bed; and
 (b) a pair of sorter conveyors each having a framework and mounting means mounting same along both sides of and elevated above said loading bed, with the forward ends of said sorter conveyors operatively engaged with the upper ends of said elevator conveyors to receive and convey crops rearwardly from same.

14. Structure according to claim 13 and including means suspending said wing conveyors from said frame substantially parallel to the ground, and including ground sensors depending from said wing conveyors and power means actuated by said ground sensors to control said means suspending said wing conveyors to keep same within a pre-determined height increment above the ground.

15. Apparatus according to claim 13 wherein said truck has a front bumper and said means to attach comprises means to attach same to said front bumper.

16. Apparatus according to claim 13 wherein said loading bed has stake pockets along the lateral sides thereof and said mounting means for mounting said sorter conveyors comprises a plurality of studs insertable into said pockets.

17. Apparatus according to claim 16 wherein said truck includes a pair of longitudinal frame members beneath the loading bed adjacent the edges thereof, and said mounting means includes diagonal braces releasably bolted to said frame members.

18. Apparatus according to claim 13 wherein said framework includes duck boards defining a standing area for workmen along each side of said loading bed.

19. Structure according to claim 13 and including a tailgate with a roller bed thereon and means for releasably and pivotally attaching same to the rear end of said truck to define an extension of said roller bed.

* * * * *